United States Patent [19]

Holzer

[11] Patent Number: 4,941,425
[45] Date of Patent: Jul. 17, 1990

[54] METHOD AND DEVICE FOR TEMPERATURE INDICATION OF FROZEN PRODUCTS

[76] Inventor: Walter Holzer, Drosteineg 19, Meersburg, Fed. Rep. of Germany

[21] Appl. No.: 254,506

[22] Filed: Oct. 6, 1988

[30] Foreign Application Priority Data

Oct. 8, 1987 [DE] Fed. Rep. of Germany ....... 3734054
Oct. 23, 1987 [DE] Fed. Rep. of Germany ....... 3735890

[51] Int. Cl.$^5$ ............................................ G01K 11/06
[52] U.S. Cl. .................................... 116/217; 116/215; 374/160
[58] Field of Search ................... 116/201, 215–219; 374/106, 160, 162; 426/88

[56] References Cited

U.S. PATENT DOCUMENTS 3,701,282 10/1972 Peterson ............................ 116/217
4,051,804 10/1977 Garnett ............................... 116/219

FOREIGN PATENT DOCUMENTS 2538901 7/1984 France .............................. 116/216
2611899 9/1988 France .............................. 374/162

Primary Examiner—Allan N. Shoap
Assistant Examiner—W. Morris Worth
Attorney, Agent, or Firm—Skjerven, Morrill, MacPherson, Franklin & Friel

[57] ABSTRACT

A method and devices for indication of temperature in frozen products are disclosed. The method involves placing an indicator having a cavity partly filled with a fluid in the freezing equipment. The fluid is frozen, and the indicator inverted. If the freezing equipment malfunctions and the freezer warms up, the fluid will melt and flow down, indicating a malfunction. The present invention includes paired indicators for use with frozen products that may be moved around in the freezing equipment; fluids in the two indicators are frozen in positions 180° apart, so even if the indicator is inverted, it is still possible to get a valid temperature indication.

14 Claims, 3 Drawing Sheets

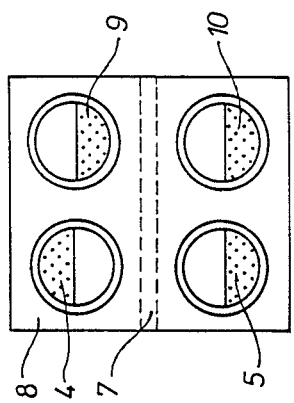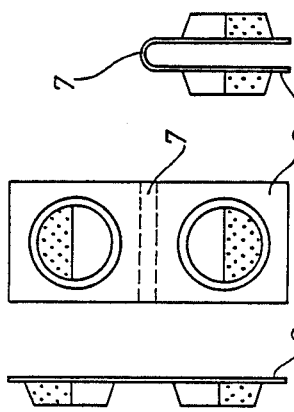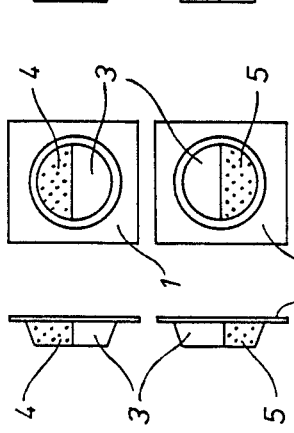

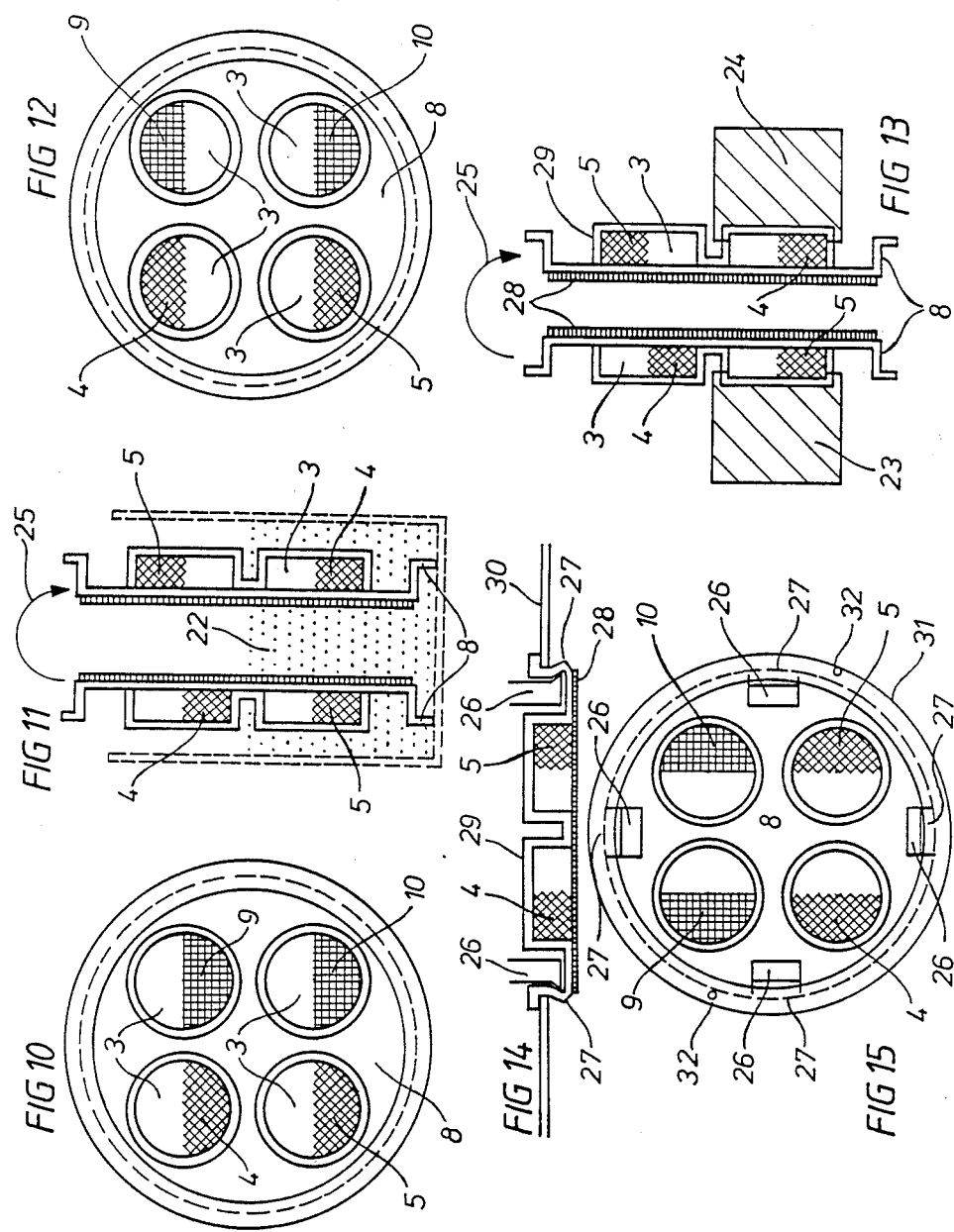

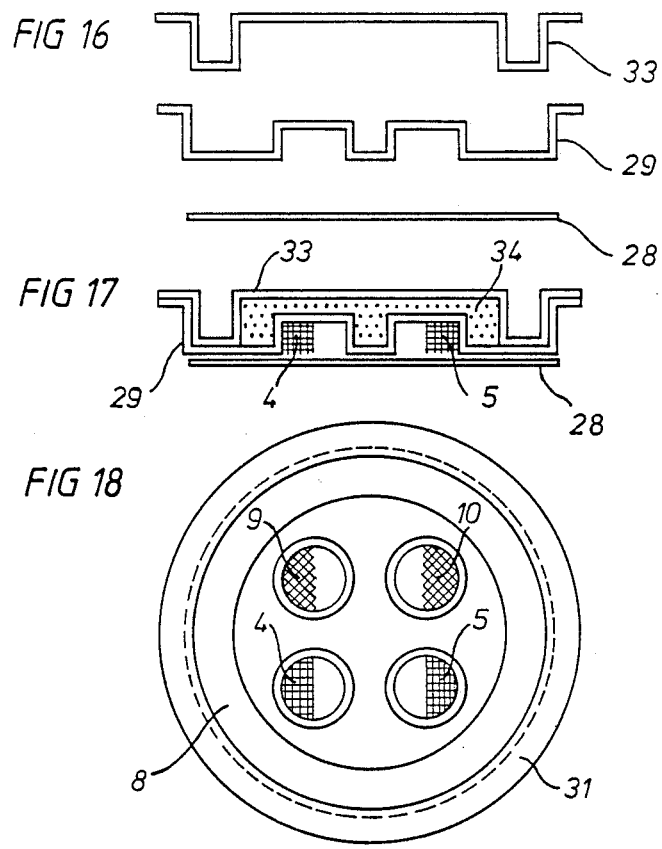

METHOD AND DEVICE FOR TEMPERATURE INDICATION OF FROZEN PRODUCTS

RELATED APPLICATION

In copending patent application Ser. No. 07/251,607 filed Sept. 30, 1988, a method and device for temperature indication and control of freezing equipment were described.

BACKGROUND OF THE INVENTION

1. Field of the Invention

This invention relates to indication of temperatures for frozen products.

2. Description of the Prior Art

The copending application described above discloses a vessel (an indicator) having one or more cavities, each of which is partly filled with indicator fluid, that at certain temperatures freeze. During freezing, at first the indicator is placed in a first position, and under the influence of gravity, the indicator fluids flow into the deepest part of the cavities and freeze in the first part of the cavities. After freezing the indicator is brought into another, second position, i.e. is inverted, so that during any melting, the indicator fluids flow into a second part of the cavities; this second part is then the deepest part of the cavity.

This procedure and the various disclosed embodiments are for temperature control for freezing equipment.

The problem for the monitoring of cold-storage and frozen products is different, because one should assume at the beginning, that in storage and later while the products are displayed, such as in a deep-freezer, that the products are moved arbitrarily, so that under circumstances of melting of the indicator fluids one cannot necessarily observe if the indicator has been inverted to the freezing position by chance.

For these reasons, the copending patent application's described method does not suit the temperature control of movable products.

SUMMARY OF THE INVENTION

The objective of the present invention is to improve the method of the copending application in such a way that it is suitable for cold-storage and frozen products and also prevents an intentional falsification of the frozen status of the products.

According to the present invention, for each critical temperature at least two indicators are used, and these are each filled with indicator fluids of similar melting temperature, that however are placed in a staggered position against the frozen product in such a way, that in any desired orientation of the frozen product at least one indicator fluid, affected by gravity, flows into a second part of the cavity during any melting. A rotation of the indicators of 180° consequently turns both of them upside down, so that during melting at least one fluid flows down, i.e. moves.

Another embodiment of the invention is that an indicator contains at least two cavities with indicator fluids of similar melting temperature and at first the indicator is brought into a position so that only the indicator fluid in the first cavity comes in contact with a freezing mixture and freezes in a predetermined geometrical form and subsequently the indicator is brought into a second position, in which the indicator fluid in the second cavity makes contact with a freezing mixture and also freezes in a predetermined, upside down, geometrical form.

As an alternative one can use a fluid as the freezing mixture, in which at first the indicator is immersed only so far, so that only the fluid in the first cavity freezes and in the second position one then immerses the second cavity subsequently.

Another embodiment of the invention consists in applying the coldness with a chilled mold to the desired place on the indicator only.

A particular economical and easy to manufacture embodiment of the indicator of the invention consists of a blister pack of two foils that are fixed together, between which the indicator fluid is held in thermally formed cavities.

A further embodiment is provided by a blister pack with one foil of heat conducting material and the other foil being heat insulating. The indicator is applied to the frozen product with the heat conducting foil, e.g. of aluminum, on the product. The foil of heat conducting material represents a very good thermal bond to the frozen product. The heat insulation protects against unintentional influence from the outside, i.e. from the ambient temperature.

In order to reduce the unintentional influence of the ambient temperature further, it is possible to provide a further additional foil as heat insulation. This also serves to prevent, during handling of the frozen products, a misleading reading of the indicator following a few seconds exposure to heat under circumstances whereby the frozen product itself did not warm up at all.

Such an additional foil is very effective when it includes an encapsulated air-space.

Another embodiment of the invention consists in filling the airspace between the heat insulating foils with a fluid, whereby the fluid's melting point lies as far below the melting point of the indicator fluid as possible. Then this fluid forms a kind of heat buffer, because at first the heat of melting for melting this fluid must be accumulated, before the temperature can rise again in order to melt finally the indicator fluid. Such a "latent cold storage" essentially helps to accomplish the chief objective of the invention, namely to indicate accurately the temperature of the frozen goods.

Another embodiment of the invention uses the heat conducting foil as a kind of thermometer probe, in which one extends the foil where it is connected to the frozen product.

Also, various methods to attach the indicators to the packaging of the frozen products is an aspect of the invention.

One method is to provide fasteners directly for the indicator, the fasteners being thermally and/or mechanically connectable to the packaging of the frozen product. Included are pressable or thermally transformable parts of the indicator housing, that penetrate into the product or anchor or fuse with it.

BRIEF DESCRIPTION OF THE DRAWINGS

FIG. 1 shows a first embodiment of the invention.
FIG. 2 shows a side view of FIG. 1.
FIG. 3 shows a second embodiment of the invention.
FIG. 4 shows a side view of FIG. 3.
FIG. 5 shows the embodiment of FIG. 4, bent.
FIG. 6 shows a third embodiment of the invention.
FIG. 7 shows a fourth embodiment of the invention.
FIG. 8 shows a fifth embodiment of the invention.

FIG. 9 shows a sixth embodiment of the invention.

FIG. 10 shows a seventh embodiment of the invention.

FIG. 11 shows the embodiment of FIG. 10 in use.

FIG. 12 shows the embodiment of FIG. 10 in further use.

FIG. 13 shows the embodiment of FIG. 10 in further use.

FIG. 14 shows an eighth embodiment of the invention.

FIG. 15 shows a side view of FIG. 14.

FIG. 16 shows part of a ninth embodiment of the invention.

FIG. 17 shows additional structure of the embodiment of FIG. 16.

FIG. 18 shows a side view of FIG. 17.

DETAILED DESCRIPTION OF THE INVENTION

FIGS. 1 to 9 show several embodiments of the invention, whereby the relationship of the positions during freezing results from folding or bending the indicator.

FIGS. 1 and 2 show two individual indicators (1) and (2), which are placed onto the frozen product in order to avoid dependence on the exact placement. Indicator fluids (4) and (5) are represented in frozen condition; however indicator (1) is rotated 180° in its position opposite to indicator (2), so that fluid (4) is situated up and fluid (5) is down. Assuming that the represented indicators are vertically attached to the frozen product, nothing will change about the position of fluid (5) during melting. But fluid (4) will melt and flow into the lower empty cavity (3).

FIGS. 3, 4 and 5 represent a double-indicator (6), on which two indicators (1) and (2) are situated. They are separated by a bending edge (7).

FIG. 5 shows how the double-indicator (6) is prepared for freezing. Therefore indicator (1) is bent at the bending edge (7) and under the influence of gravity, the fluids (4) and (5) are situated in their respective lower regions and are frozen in this position. After freezing, the double-indicator (6) is flattened out again and therefore is in the position of FIG. 4, e.g. in the indicated position, fluid (4) is up and looks like FIG. 2. In FIG. 5, both indicator fluids (4) and (5) flow away from the bending edge (7), affected by gravity.

FIG. 6 represents a multi-indicator (8) for two temperatures. Because, according to the invention, each temperature has two opposing grouped indicators, this multi-indicator (8) altogether includes four indicators, whereby fluids (4) and (5) indicate a first melting temperature and fluids (9) and (10) indicate another, lower temperature. This symmetrical arrangement relative to the bending edge (7) facilitates the recognition of the indicated temperature. As long as the fluids, as shown in FIG. 6, lie symmetrically with regard to the bending edge (7), as do indicator fluids (4) and (5), this melting temperature has not yet been exceeded. On the other hand, indicator fluid (9) compared to indicator fluid (10), has flowed into an unsymmetrical position and shows that this temperature (i.e., the melting temperature of fluid (9) and (10)) has already been exceeded at least once.

The appearance of the indicator fluids in FIG. 6 will appear in case the indicator fluids (4) and (5) are for a melting temperature of −12° C. and the indicator fluids (9) and (10) are for a melting temperature of −18° C. If just for a short time, a temperature between −18° C. and −12° C. had appeared, then it would have been registered by the configuration as shown in FIG. 6. Also if the indicator would freeze again later on, at a lower temperature, nothing about this representation would change.

Also in the event of any tilting of the indicator (8), the level of liquid of the indicator fluid (9) will be tilted also, yet the melting condition will still be clearly indicated.

FIG. 7 depicts the placing of two indicators (11) and (12) onto the frozen product (15) that is frozen in a packaging (16). The indicators (11) and (12) have thermometer probes (13 and 14), that are inserted between the packaging (16) and the frozen product (15). Thermometer probes (13) and (14) consist of a heat conducting material, e.g. copper or aluminum, and thereby ensure good conduction of the heat to the actual indicators (11) and (12). After the thermometer probes (13) and (14) have been inserted between the packaging (16) and the frozen product (15), the indicators are folded around the bending edge (7), and fluids (4) and (5) lie against the frozen product (15).

FIG. 7 shows an extreme case with the indicators horizontally arranged, which would provide an exposed large surface area of indicator fluids (4) and (5).

Likewise, FIG. 8 represents application of a multi-indicator onto the frozen product (15) in packaging (16). For this construction, FIG. 8 shows how indicators (1) and (2) are folded around the bending edge (7), so that they will freeze in the indicated order. After freezing, the bending is flattened out at the edge (7) and by laying the indicator along edge (17) it is applied to the frozen product, as indicated by dashed lines. In the example of FIG. 8, the fluids (5) and (4) have flowed in the same direction towards the bending edge (7), after the folding of the multi-indicator (8) around the bending edge (7). Only after flattening out of the bending edge (7) do they too come into opposing positions.

Also in FIG. 8, the multi-indicator with the thermometer probe (13) is inserted between the frozen product (15) and the packaging (16). With the multi-indicator of FIG. 8, indicators for several temperatures can be arranged similar to those of FIG. 6, along the bending edge (7) one behind the other or side by side.

FIG. 9 shows an embodiment of a multi-indicator very suitable for several frozen products (15) and (18), that are placed in a joint packaging (16). Thereby both indicators (1) and (2), with their thermometer probes (13) and (14), are placed between the frozen products (15) and (18). Thereby the bending edge (7) connects the thermometer probes (13) and (14), so that the use of the multi-indicator is simple. The bending edge (7) is inserted to position (19) and then, after freezing, both indicators (1) and (2) are placed onto the sides (20) and (21) of the frozen products (15) and (18), as FIG. 9 shows in dashed lines.

The freezing of a multi-indicator according to FIG. 9 is very simple, because the bending edge (7) lies between the thermometer probes (13) and (14) and this elongated construction allows a simple handling.

FIGS. 10 to 14 show embodiments of indicators according to the invention, by which the indicated position results from chronological freezing.

FIG. 10 shows a double-indicator (8) with the not yet frozen indicator fluids (4), (5) and (9), (10), arranged in pairs, in the four cavities (3). Indicator fluids (4) and (5) melt at the same temperature, as do the indicator fluids (9) and (10).

In FIG. 11, the indicator (8) is shown immersed in liquid freezing mixture (22) (a freezing means) during freezing. At the left in FIG. 11, only indicator fluid (5) in indicator (8) is immersed in freezing mixture (22) which is severely undercooled which results in a quick freezing of the indicator fluid (5).

Indicator fluid (4) is not yet immersed and does not yet freeze. Only after inverting the indicator (8), in the direction of the arrow (25) as indicated in FIG. 11, does indicator fluid (4) enter the freezing mixture (22) and freeze; affected by gravity, indicator fluid (4) flows into and freezes in the deepest part of the cavity (3).

In practice, indicator (8) will be dipped so deeply after being inverted that both indicator fluids (4) and (5) lie immersed in the freezing mixture (22).

FIG. 12 represents indicator (8) after freezing.

FIG. 13 shows freezing with the chilled mold (23) and (24). On the left side indicator fluid (5) is frozen at first by applying the chilled mold (23), then indicator (8) is turned in the direction of the arrow (25) thereby, the not yet frozen indicator fluid (4), affected by gravity, flows down into the indicated position and is frozen there by applying the chilled mold (24).

In the above depicted embodiments, the blister pack type indicators are shown for simplicity.

The use of the indicators is improved if the foil that is attached to the frozen product (28) is made of a heat conducting material, (i.e., aluminum) and the foil (29) that is exposed to the ambient temperature is made of insulating material, (i.e., P.V.C. or similar material), as shown in FIG. 14 and FIG. 15.

An objective of this invention is an improved kind of heat insulation, in order to prevent melting of the indicators during short-duration heating. FIGS. 16 to 18 represent such a heat insulating indicator.

FIG. 16 shows the design of an indicator (8) having three foils. The first foil (28) is heat conducting and is closely connected to the frozen product. Foil (29) is like foil (33) made from heat insulating material. To obtain an even better thermal insulation, an air-space (34) is provided between foils (29) and (33), as indicated in FIG. 17. FIG. 18 shows a side view of FIG. 17.

A further improvement can be obtained, if one fills the space (34) with a fluid that has a melting point far under the melting point of the indicator fluid. This fluid is a "latent cold-storage", so the temperature can only rise after the supply of melting heat to the fluid and thus provides protection against short-duration heating.

FIGS. 7 to 10 depict a method to bond thermally the indicator as closely as possible to the frozen product. In this example the heat insulating foil (13) is extended and in FIG. 9 the foil even reaches directly between the frozen products (15) and (18).

FIGS. 14 and 15 represent an embodiment of the invention for the efficient application of the indicators to the packaging of the frozen products.

In this case the circular indicator (8) is inserted in a hole in the packaging cardboard (30) and anchored in the cardboard by means of fastener dies. This fastening can be done thermoplastically by heating and spreading the fastener dies, which bend foil (29) and thereby produce bulges.

It also is advantageous to attach the flange (31) (FIG. 15) directly to the packaging (30) with several bonding points (32). Thereby any kind of bonding is usable, as long as no inadmissible heating of the frozen products occurs.

It is to be emphasized that FIGS. 1 to 18 are only to be understood as basic schematic representations of the invention, because the method of the invention can easily be modified for all packaging and all characteristics of the frozen products.

It is also possible in the invention to indicate the temperatures by the known methods of lettering and special coloring of the indicator fluids (see copending application Ser. No. 07/251,607).

It is also emphasized that by use of a thermometer probe, not only a better indication of the actual temperatures will be obtained, but also adhesion or other attachment means can be eliminated in the given application method.

Also the styling of the indicators, which are shown as round hollow bodies, is modifiable to any taste. The indicators can be shaped as squares or as stripes, or in any other desired styling.

Numerous further modifications of the invention will be obvious to one skilled in the art, from the foregoing.

I claim:

1. A method for monitoring the temperature of a frozen product using at least two transparent sealed chambers, each sealed chamber encapsulating an indicator fluid, said indicator fluid partly filling said sealed chamber and being permanently constrained within said sealed chamber, the method comprising the steps of:

freezing the indicator fluid of each sealed chamber in mutually opposing first positions in the respective chambers; and placing the at least two sealed chambers in contact with the frozen product such that (i) in any desired orientation of the frozen product the frozen indicator fluid in at least one sealed chamber upon melting flows under the influence of gravity into a second position within said at least one sealed chamber and (ii) upon melting, the relative positions of said fluids in said sealed chambers being different from said mutually opposing first positions for all orientations of said frozen product irrespective of any subsequent refreezing and rethawing of said fluids while contact between said sealed chambers and said frozen product is maintained thereby indicating that the temperature of said frozen product has risen above the melting temperature of said indicator fluid.

2. The method of claim 1, wherein the at least two sealed chambers have indicator fluids of similar melting temperature, and the at least two sealed chambers are contained within a member having a first edge and a second edge; each of said chambers is adjacent to one of said edges and separated from the other edge by the other chamber; and a portion of said member separates and lies between said chambers, further comprising the step of:

prior to the step of freezing, bending the member to form a bend in said portion of said member separating and lying between said chambers so that the indicator fluid in each sealed chamber flows under the influence of gravity into the portion of the sealed chamber closest said edge adjacent to the chamber and most remote from the bend so that upon freezing, said indicator fluids are in a position most remote from the bend.

3. The method of claim 1, wherein the step of freezing comprises freezing a first of said sealed chambers by bringing the first sealed chamber in contact with a freezing means and freezing the first sealed chamber in a predetermined form, and freezing a sound of said sealed chambers subsequently in a predetermined form.

4. The method of claim 3, wherein the freezing means is a fluid.

5. The method of claim 3, wherein the freezing means is a chilled mold.

6. A frozen product temperature indicator comprising:
- at least two transparent sealed chambers, each sealed chamber encapsulating an indicator fluid that freezes at a certain temperature, said indicator fluid partly filling said sealed chamber and being permanently constrained within said sealed chamber wherein the indicator fluids of said sealed chambers are frozen in mutually opposing first positions in the respective chambers; and
- means for placing the at least two sealed chambers in contact with the frozen product, wherein in any desired orientation of the frozen product, (i) the indicator fluid in at least one sealed chamber upon having been frozen in said first position in the chamber, during melting flows under the influence of gravity into a second position within said at least one sealed chamber and (ii) upon melting, the relative positions of said fluids in said sealed chambers being different from said mutually opposing first positions for all orientations of said frozen product irrespective of any subsequent refreezing and rethawing of said said fluids while contact between said sealed chamber and said frozen product is maintained thereby indicating that the temperature of said frozen product has risen above the melting temperature of said indicator fluid.

7. An indicator according to claim 6, wherein the at least two sealed chambers are contained within a member having a first edge and a second edge; each of said chambers is adjacent to one of said edges and separated from the other edge by the other chamber; and a portion of said member separates and lies between said chambers, and further wherein upon bending the member to form a bend in said portion of said member separating and lying between said chambers, the indicator fluid in each sealed chamber flows under the influence of gravity into the portion of the sealed chamber closest said edge adjacent to the chamber and most remote from the bend.

8. An indicator according to claim 7, wherein the at least two transparent sealed chambers contained within said member further comprise:
- a first foil; and
- a second foiled having a first edge and a second edge, a first cavity adjacent to said first edge, a second cavity adjacent to said second edge, and a portion separating and lying between said cavities wherein said indicator fluid is placed in said first and said second cavities and said second foil is fixedly attached to said first foil so as to form said at least two transparent sealed chamber contained within said member.

9. An indicator according to claim 6, wherein said means for placing the sealed chambers in contact with the frozen product further comprises means for fastening the sealed chambers to the frozen product.

10. A frozen product temperature indicator comprising:
- at least two isolated transparent sealed chambers, each sealed chamber encapsulating an indicator fluid that freezes at a certain temperature, said indicator fluid partly filling said sealed chamber and being permanently constrained within said sealed chamber, said at least two sealed chambers further comprising:
  - a heat conducting foil; and
  - an insulating foil, said insulating foil having a first edge, a second edge opposite to said first edge, a first cavity adjacent to said first edge, a second cavity adjacent to said second edge, and a portion separating and lying between said cavities wherein upon said indicator fluid being placed in said first and said second cavities, said heat conducting foil is fixedly attached to said heat insulating foil so as to form said at least two isolated transparent sealed chambers; and
- means for placing the at least two sealed chambers in contact with the frozen product, wherein in any desired orientation of the frozen product, the indicator fluid in at least one sealed chamber upon having been frozen in a first position in the chamber during melting flows under the influence of gravity into a second position with said at least one sealed chamber thereby indicating that the temperature of said frozen product has risen above the melting temperature of said indicator fluid.

11. An indicator according to claim 10 further comprising a second transparent insulating foil wherein said second insulating foil is fixedly attached to the side of said first-mentioned insulating foil opposite to the side fixedly attached to said heat conducting foil.

12. An indicator according to claim 11, said second insulating foil being fixedly attached to said first insulating foil so as to define an air space between said first and second insulating foils.

13. An indicator according to claim 12, further comprising another fluid having a melting temperature less than the melting temperature of said indicator fluid wherein said fluid is encapsulated in said air space.

14. An indicator according to claim 10 wherein said heat conducting foil extends beyond one of said edges of said insulating foil thereby providing a temperature probe insertable in the frozen product.

* * * * *